United States Patent
Ohtsuka

(10) Patent No.: US 7,624,227 B2
(45) Date of Patent: Nov. 24, 2009

(54) DRIVE DEVICE AND RELATED COMPUTER PROGRAM

(75) Inventor: Takeshi Ohtsuka, Hyogo (JP)

(73) Assignee: Panasonic Corporation, Osaka (JP)

(*) Notice: Subject to any disclaimer, the term of this patent is extended or adjusted under 35 U.S.C. 154(b) by 110 days.

(21) Appl. No.: 10/573,566

(22) PCT Filed: Oct. 28, 2004

(86) PCT No.: PCT/JP2004/016365

§ 371 (c)(1),
(2), (4) Date: Mar. 27, 2006

(87) PCT Pub. No.: WO2005/041207

PCT Pub. Date: May 6, 2005

(65) Prior Publication Data

US 2006/0282634 A1    Dec. 14, 2006

(30) Foreign Application Priority Data

Oct. 29, 2003  (JP)  ............... 2003-369554

(51) Int. Cl.
G06F 12/00  (2006.01)
G06F 13/00  (2006.01)
G06F 13/28  (2006.01)

(52) U.S. Cl. ................. 711/112; 711/100; 710/6; 710/24

(58) Field of Classification Search ................. 711/100, 711/113, 112; 710/24, 6
See application file for complete search history.

(56) References Cited

U.S. PATENT DOCUMENTS

| | | | | |
|---|---|---|---|---|
| 4,149,243 A | * | 4/1979 | Wallis | 718/106 |
| 5,297,148 A | * | 3/1994 | Harari et al. | 714/710 |
| 5,551,002 A | * | 8/1996 | Rosich et al. | 711/134 |
| 5,579,502 A | * | 11/1996 | Konishi et al. | 711/103 |
| 6,029,226 A | * | 2/2000 | Ellis et al. | 711/100 |
| 6,272,632 B1 | * | 8/2001 | Carman et al. | 713/168 |
| 6,427,184 B1 | | 7/2002 | Kaneko et al. | |
| 6,826,650 B1 | * | 11/2004 | Krantz et al. | 711/112 |
| 7,181,548 B2 | * | 2/2007 | Ellis et al. | 710/5 |
| 2001/0032326 A1 | | 10/2001 | Haneda | 714/54 |
| 2002/0108003 A1 | | 8/2002 | Ellis et al. | |

FOREIGN PATENT DOCUMENTS

| | | |
|---|---|---|
| JP | 2-56625 | 2/1990 |
| JP | 2001-202281 | 7/2001 |
| JP | 2001-256106 | 9/2001 |

OTHER PUBLICATIONS

Canadian Office Action issued Jun. 3, 2009 in counterpart Canadian Application No. 2,539,077.

* cited by examiner

Primary Examiner—Stephen C Elmore
Assistant Examiner—Mark A Giardino, Jr.
(74) Attorney, Agent, or Firm—Wenderoth, Lind & Ponack, L.L.P.

(57) ABSTRACT

A drive device capable of preventing a drop in the data transfer rate, even when write instructions from a host device are given with commands having a short write data length. If the write end address of one of a plurality of ATA commands issued by a host device 2 is consecutive with the write start address of the next ATA command, a command analysis unit 11 has data writing to an SD card 1 by the consecutive commands performed in a single process. As a result, overheads when writing data to SD cards are incurred only once, allowing the transfer rate to be improved.

10 Claims, 14 Drawing Sheets

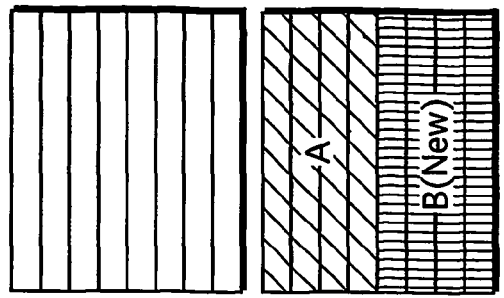
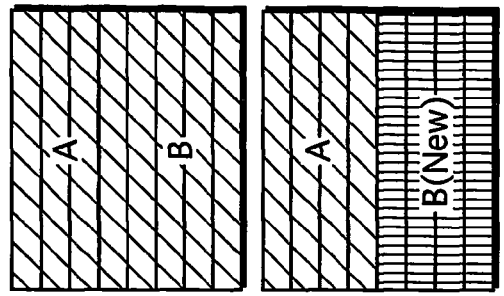
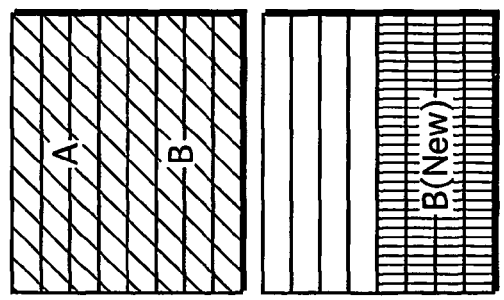
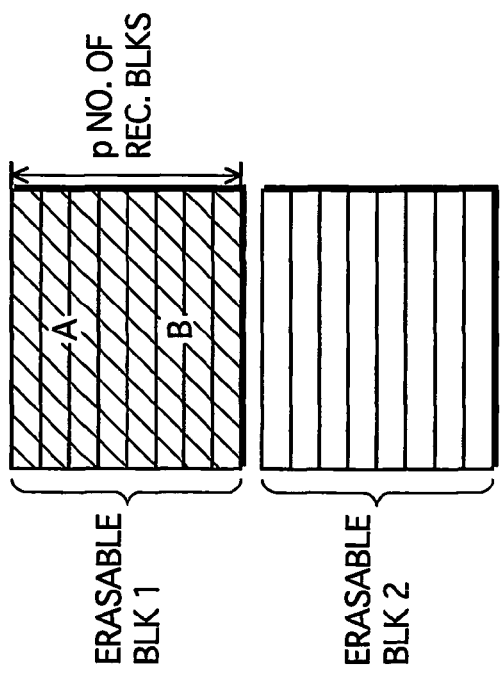

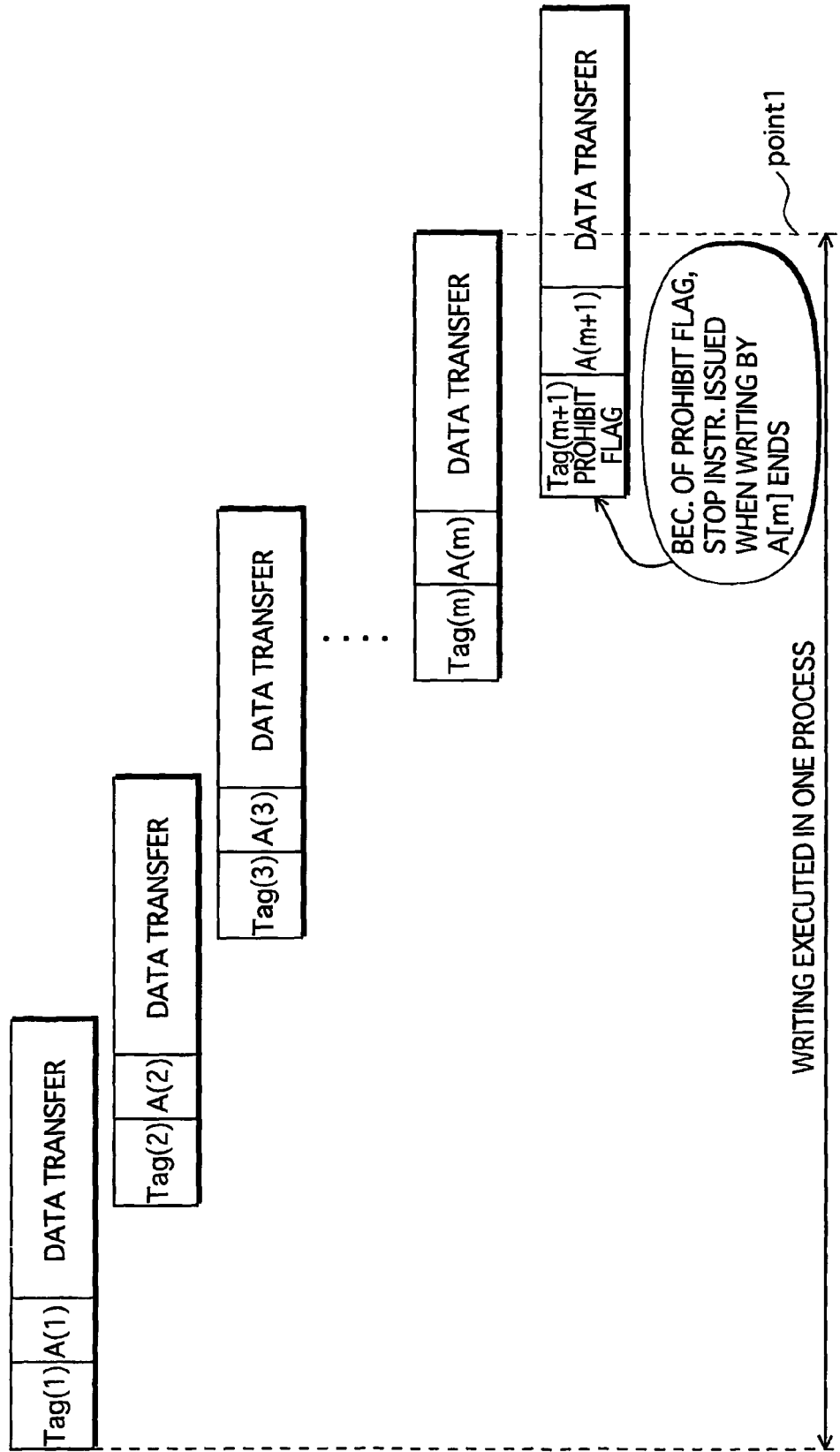

150
DRIVE DEVICE AND RELATED COMPUTER PROGRAM

TECHNICAL FIELD

The present invention, which belongs to the technical field of controls on data writing to nonvolatile memory, relates to improvements when this technology is applied to drive devices for memory cards having built-in nonvolatile memory and computer programs for accessing such memory cards.

BACKGROUND ART

Currently, memory card drive devices are attracting attention, not only in the field of consumer equipment, but also in the field of professional video equipment. The following description relates to an exemplary system structure that uses SD memory cards (hereinafter abbreviated to "SD card") in video recording when gathering news material and the like. Conventional filming systems employing SD cards are constituted from a host device and a drive device. The SD card is connected to the drive device via an adaptor having a PCM-CIA card configuration.

Since the SD card is connected to the drive device via a PCMCIA card, the host device can access the SD card using the same procedures for accessing the PCMCIA card. The adaptor can also be used to connect a plurality of SD cards, and the host device is capable of handling the plurality of connected SD cards as a single PCMCIA card.

Video can be recorded on SD cards if the host device is a video camera or personal computer having a PCMCIA card interface, increasing the uses to which SD cards, as video recording media, can be put. Technology also exists for forming a memory card array for use in video recording by mounting multiple memory cards.

SUMMARY OF THE INVENTION

Since SD cards in conventional filming systems are connected via a PCMCIA card, reading and writing from/to an SD card performed by the host device is instructed using ATA commands. The data length writable with a single ATA command is only 128 Kbytes, meaning that if one wants to write video data having a size of several gigabytes or several hundred megabytes to an SD card, the host device will have to issue several hundred or several thousand ATA commands to the drive device. When a large number of ATA commands are issued to the drive device, the adverse effect of overheads incurred when writing data to an SD card becomes noticeable.

These overheads originate from (i) processing to change the correspondence between logical addresses and physical addresses, and (ii) processing to verify data written to the SD card. Since overheads exist in the time period writable with a single ATA command despite the short data length writable with this command, the transfer rate calculated by dividing the write data length with the write time period is relatively low. For instance, if an SD card array is formed by mounting multiple SD cards and data writing to the SD cards is performed in parallel, the data length writable at any one time to each SD card is reduced by half in the case of a two card array and by three quarters in the case of a four card array. The effect on the transfer rate caused by overheads is thus further increased when forming SD card arrays, because of the further reduction in the data length writable with a single command.

An object of the present invention is to provide a drive device capable of preventing a drop in the transfer rate even when write instructions from a host device are given using commands having a short write data length.

To resolve the above problems, a drive device pertaining to the present invention is for writing data transmitted by a host device onto a memory card in accordance with a command issued by the host device, and includes a receiving unit operable to receive a plurality of commands issued by the host device, and a writing unit operable, if a write end address of one of the received commands is consecutive with a write start address of a following command, to perform the data writing to the memory card by the consecutive commands in a single process.

Because the above drive device executes data writing to a memory card by a plurality of commands in a single process, overheads are incurred only once, even for a plurality of commands. Write processing delays due to overheads can thus be prevented.

In terms of the equation used for calculating the transfer rate (i.e. "data length to be written" divided by "time period required for data writing"), the numerator (i.e. write data length) is the sum total of data lengths for writing by the plurality of commands. The denominator (i.e. write time period), on the other hand, is the sum total of time periods required for data writing by the plurality of commands, though since overheads are incurred only once with respect to the plurality of commands rather than for the write period of individual commands, the time required for data writing (denominator) is shortened overall. The transfer rate calculated using the above equation is increased overall because of this shortening of the write time period, thereby allowing the device specifications sought for recording video data to be satisfied.

Here, the process may involve processing to sequentially write data received from the host device to the memory card being repeated until a STOP instruction is given, and the drive device may further include an analysis unit operable to decode the write-start address and a sector number of each command, the sector number being the number of sectors of data for writing with the command, and an instruction unit operable to give the STOP instruction at a point when a written sector number reaches s+t, where s is the sector number of the one command and t is the sector number of the following command.

Since the necessary condition for ending the write process to the memory card is a STOP instruction from the drive device, data writing by a plurality of commands can be realized in a single process by delaying the timing of the STOP instruction.

Here, the process may be activated when the analysis unit decodes a write-start address A and the sector number s from the one command, and involve the data writing being started from the write-start address A, the analysis unit may analyze the following command until the written sector number reaches s, and the instruction unit may give the STOP instruction when the written sector number reaches s+t, if a write-start address B of the following command is consecutive with a write-end address A+s of the one command.

Successive commands are analyzed without waiting for the transfer of data for writing with any one command to end. Since the time period for analyzing commands issued from the host device does not effect the time required for data writing (i.e. denominator in the above transfer rate equation), the transfer rate is not reduced by this analyzing time period, even when a large number of commands having a short write data length are issued by the host device.

BRIEF DESCRIPTION OF THE DRAWINGS

FIGS. 9A-9D show an example of wraparound saving;

FIG. 10 shows processing by command analysis unit 11 in an embodiment 2;

DETAILED DESCRIPTION OF THE INVENTION

Figure 1:
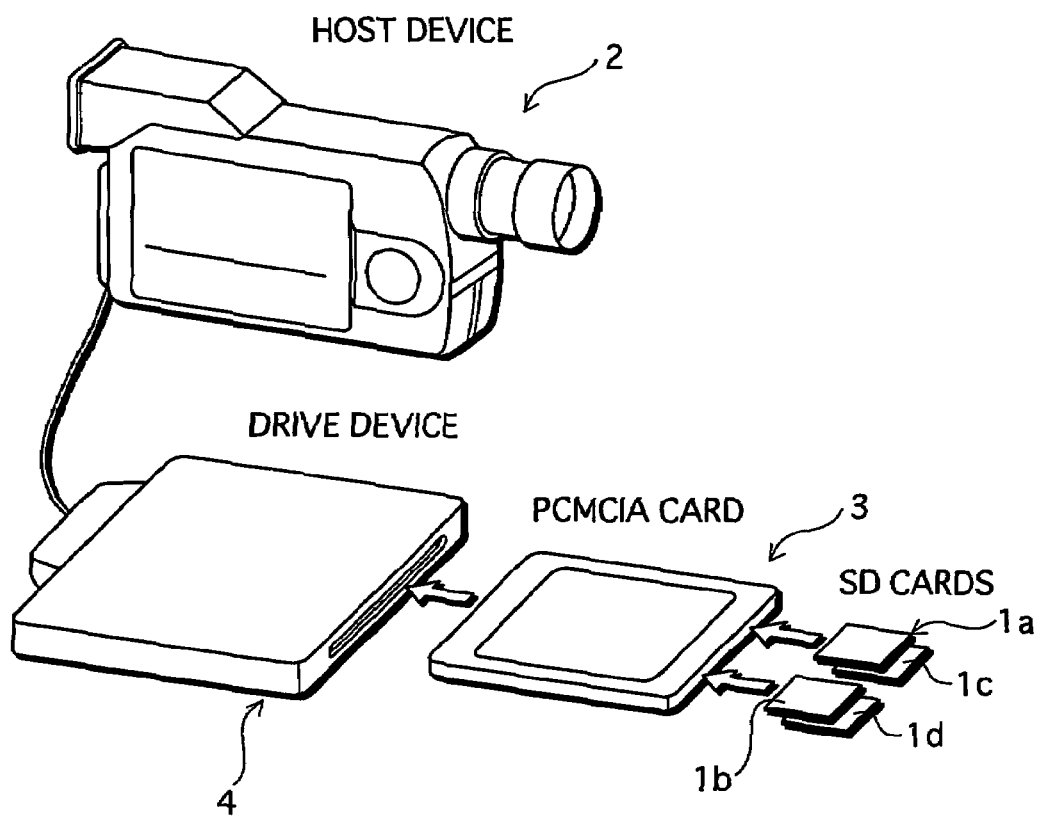
FIG. 1 shows a usage configuration of a drive device pertaining to the present invention.

Embodiments of a drive device pertaining to the present invention are described below. To begin with, a usage configuration out of the workings of a drive device pertaining to the present invention is initially described. FIG. 1 shows the usage configuration of the drive device pertaining to the present invention. In FIG. 1, the drive device pertaining to the present invention is provided for use in recording video images to SD cards 1a to 1d, in a filming system formed from SD cards 1a to 1d, a host device 2 and a PCMCIA card 3. The uses to which filming equipment are put require video and audio quality on a par with digital video tape (DV). A 4 MB/s band must be secured to realize this quality, with improvements for securing this band having been made to the above filming system. The devices constituting this system are described next.

SD cards 1a to 1d, each of which includes a control unit, a nonvolatile memory and an internal memory, write data transmitted from the drive device to the nonvolatile memory, in accordance with commands (SD commands) issued by the drive device, after having accumulated the data in the internal memory. The recording area of the nonvolatile memory is constituted from recording blocks. When writing data to the nonvolatile memory, SD cards 1a to 1d proceed to temporarily write data sent from host device 2 to free recording blocks rather than writing the data directly to the recording blocks shown by the write addresses. When the drive device issues a STOP instruction, the SD card changes the correspondence relation between the logical and physical addresses, so as to allocate logical addresses to the recording blocks to which data has been written. This change involves the rewriting of a correlation table showing the correspondence between logical and physical addresses in the nonvolatile memory. The SD card updates the correlation table, verifies the written data, and then transmits status information showing the verification result to the drive device. Status information shows whether or not a write error has occurred. The series of operations from the receipt of an SD command from drive device 4 until the transmission of status information is referred to here as a "process". Since the correlation table must be updated and the written data verified for every process, the adverse effect of overheads becomes more noticeable with increases in the number of processes.

Host device 2, which is equipment such as a video camera or a personal computer, performs data reading/writing with respect to SD cards by issuing ATA commands to the drive device. Host device 2 recognizes multiple SD cards mounted in drive device 4 as a single virtual drive, and issues ATA commands after determining the logical addresses (i.e. write addresses) and number of sectors to be written. The "sectors" referred to here correspond one-to-one with the recording blocks on SD cards 1a to 1d. Since ATA commands were originally designed for disk media, host device 2 employs "sector" units to express write addresses and the like.

PCMCIA card 3 is an adapter for mounting multiple SD cards 1a to 1d.

Figure 2:
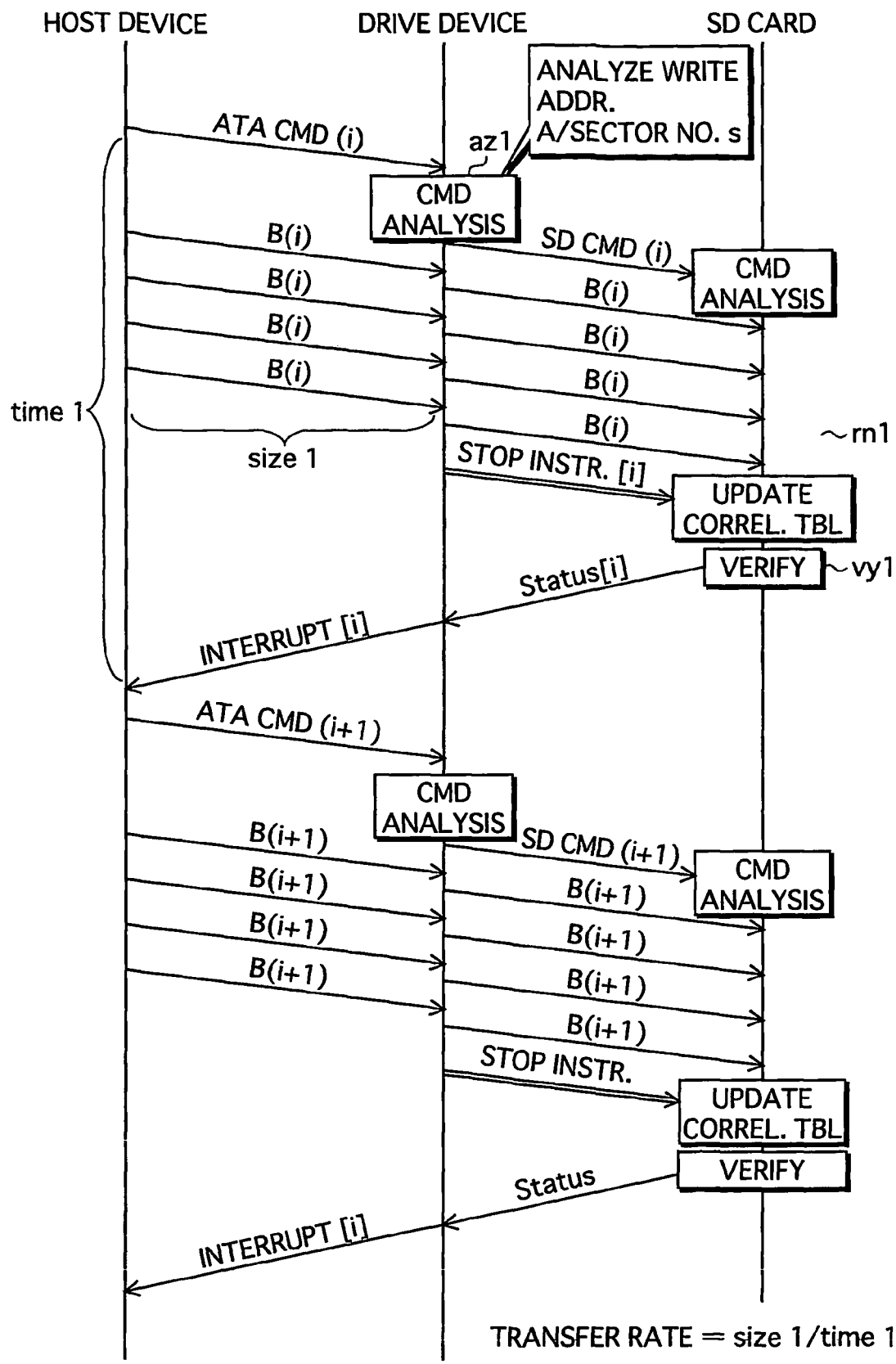
FIG. 2 shows a communication sequence between a host device 2, a drive device 4, and SD card 1.

Drive device 4 writes data to SD cards 1a to 1d connected via PCMCIA card 3, in accordance with ATA commands issued by host device 2. This data writing involves SD commands being issued to SD cards 1a to 1d, and data transmitted sequentially from host device 2 being transferred to SD cards 1a to 1d. Once all of the data for writing with an ATA command has been transferred, drive device 4 issues a STOP instruction to SD cards 1a to 1d. After the STOP instruction has been issued, drive device 4 receives status information from SD cards 1a to 1d and transmits an interrupt signal indicating a write end to host device 2, to conclude a single process. FIG. 2 shows a communication sequence between host device 2, drive device 4, and SD cards 1a to 1d. When the $i^{th}$ ATA command is issued by host device 2 as shown in FIG. 2, drive device 4 performs command analysis az1 and then issues SD command [i] to SD cards 1a to 1d. If ATA command [i] is to write four pieces of data, drive device 4 transfers data B[i] transmitted from host device 2 to SD cards 1a to 1d. Once the data for writing with ATA command [i] has been transmitted, drive device 4 transmits a STOP instruction [i] to conclude the writing by SD cards 1a to 1d. As a result of STOP instruction [i], SD cards 1a to 1d perform correlation table update rn1 and data verification vy1, before returning status information [i] to drive device 4. When status information is received, drive device 4 returns an interrupt signal [i] to host device 2. The above is the processing relating to the $i^{th}$ ATA command. The same processing is repeated when the $i+1^{th}$ ATA command is transmitted from host device 2. The transfer rate is calculated by dividing a size 1, which is the total data size that ought to be writable with an ATA command, by a time 1 from when host device 2 issues the ATA command until the receipt of an interrupt signal (i.e. size 1/time 1). Here, the transfer rate is reduced overall, since time 1 is extended by the addition of the table update and data verification times, despite the total data size writable with a single ATA command not exceeding 128 Kbytes.

Figure 3:
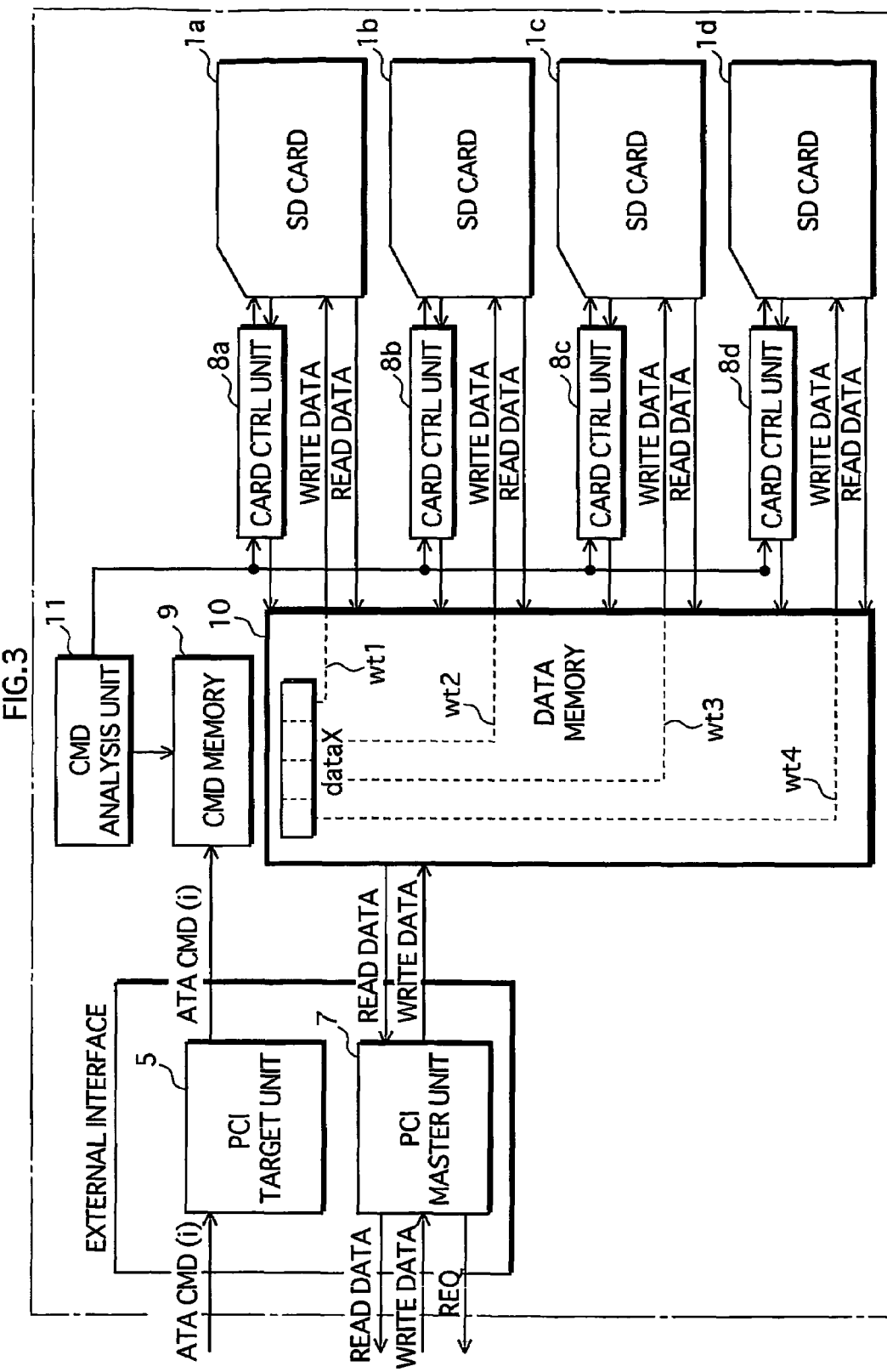
FIG. 3 shows an internal structure of drive device 4.

The above is a system configuration using drive device 4. The following description relates to a production configuration of drive device 4. Drive device 4 can be produced industrially based on the internal structure in FIG. 3. As shown in FIG. 3, drive device 4 is constituted from a PCI target unit 5, a PCI master unit 7, card control units 8a to 8d, a command memory 9, a data memory 10, and a command analysis unit 11. Card control units 8a, 8b, 8c and 8d are provided one for each of SD cards 1a, 1b, 1c and 1d mounted in the drive device. Data writing to SD cards 1a to 1d is performed using striping. "Striping" refers to the parallel writing of data onto a plurality of SD cards, after having divided the data into recording block units. The inside of data memory 10 in FIG. 3 depicts the striping of write data. Since there are four SD cards in the given example, the write data is divided in four. With the striping in FIG. 3, the first part of the divided data (dataX) is written to the first SD card (wt1), the second part is written to the second SD card (wt2), the third part is written to the third SD card (wt3), and the fourth part is written to the fourth SD card (wt4). SD cards 1a to 1d constitute a single virtual drive as a result of the striping. With striping, writing efficiency is raised if the number of sectors for writing is greater than or equal to the number of parts into which the data is divided (4 or more blocks if data divided in 4), and writing efficiency falls if less than three.

Figure 4:
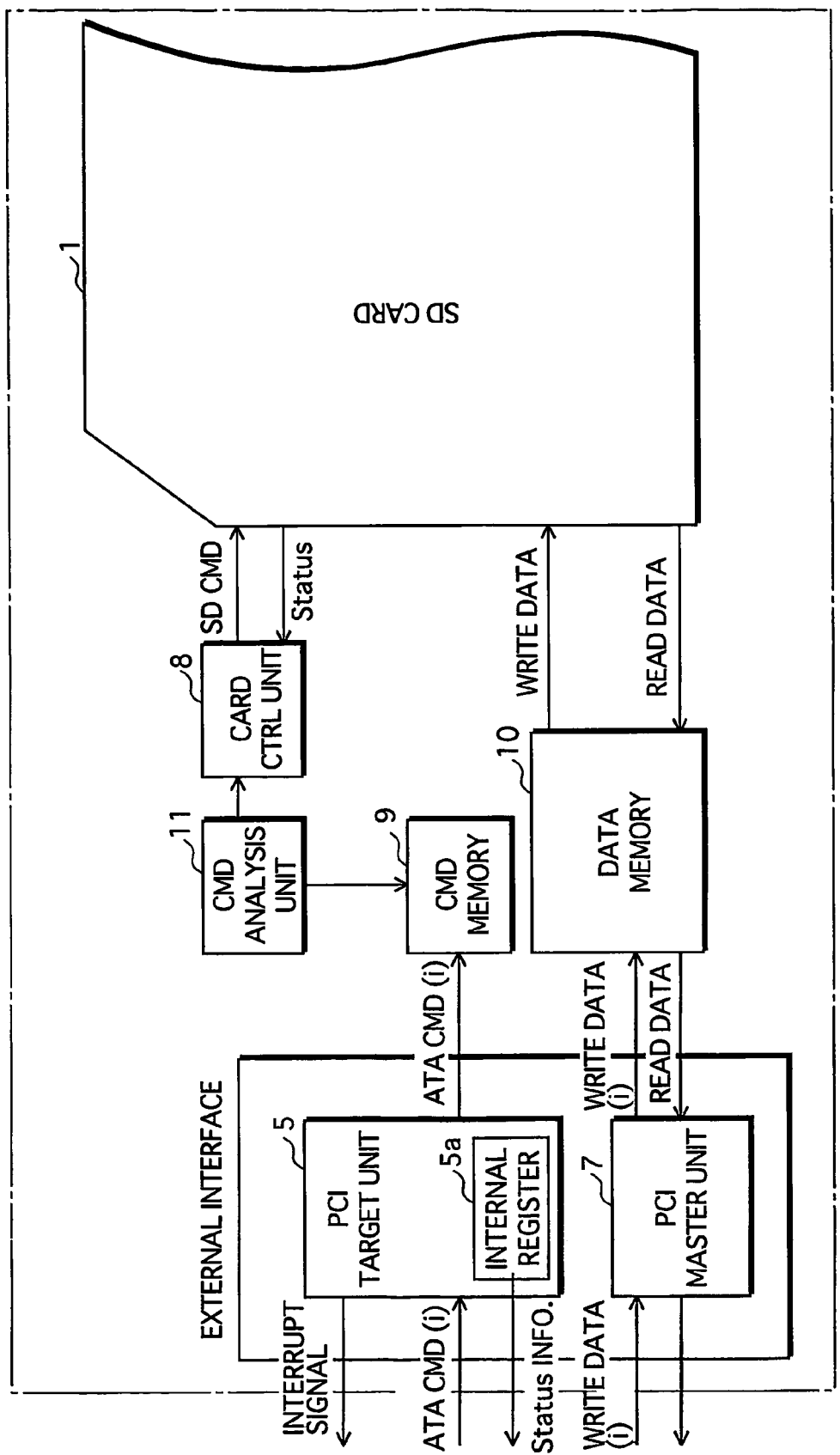
FIG. 4 shows a simplified internal structure of drive device 4.

Since the description becomes complicated with an internal structure that assumes four SD cards, the following description refers to the internal structure diagram of FIG. 4, with the intention of simplification. In comparison with FIG. 3, SD cards 1a-1d and card control units 8a-8d in FIG. 4 are shown as SD card 1 and card control unit 8, respectively. The components (PCI target unit 5, PCI master unit 7, card control unit 8, command memory 9, data memory 10, command analysis unit 11) in FIG. 4 are described next.

PCI target unit 5 has an internal register 5a, and executes transmission/reception of commands and status information with host device 2 via the internal register. This transmission/reception at the time of writing from host device 2 is performed as follows. Host device 2 writes a write command to internal register 5a in PCI target unit 5 when writing is to be performed. As described below, PCI master unit 7 becomes a bus master when the write command is written to the internal register, and data transfer with host device 2 is commenced. When the data transfer ends, PCI target unit 5 stores status information in internal register 5a, and asserts an interrupt signal to host device 2. As a result of the interrupt signal, host device 2 reads the status information via internal register 5a of PCI target unit 5. Data transfer is performed with this transmission and reception of commands and status information.

As mentioned above, PCI master unit 7 becomes a bus master when a write command is written to the internal register in PCI target unit 5, and executes data transfer with drive device 4 as the master.

Card control unit 8 executes read/write controls on SD card 1, issuing SD commands, transferring data and issuing STOP instructions to SD card 1, in accordance with the result of command analysis performed by command analysis unit 11 (described below).

Command memory 9 stores ATA commands transmitted from host device 2 in a wait queue. ATA commands transmitted from host device 2 differ from common ATA commands in that tags are appended. These tags specify the numbering of individual ATA commands, and since command memory 9 stores the ATA commands with the tags still appended, command analysis unit 11 is able to analyze commands within command memory 9 in accordance with the order in which they were issued by host device 2.

Data memory 10 is an internal memory for temporarily storing data for writing to SD card 1 and data read from SD card 1.

Figure 5:
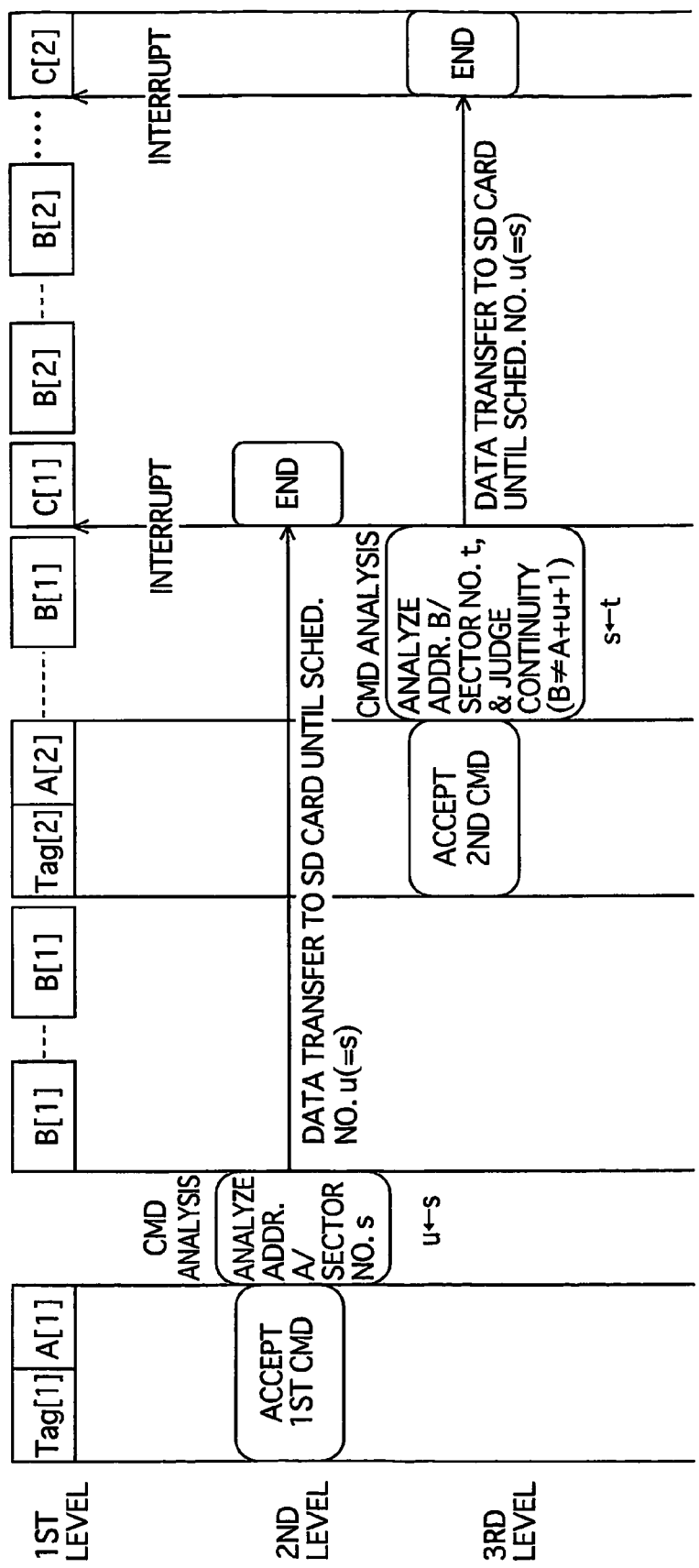
FIG. 5 is a timing chart showing how processing by a command analysis unit 11 is performed when host device 2 issues a plurality of commands.

Command analysis unit 11 accepts commands issued by host device 2, analyzes the commands, and controls PCI master unit 7 to perform writing in accordance with the analysis result. FIG. 5 is a timing chart showing how processing by command analysis unit 11 is performed in the case of host device 2 issuing a plurality of commands. The first level of FIG. 5 shows the content transmitted over the transmission route between host device 2 and SD card 1. $A[x]$ is the $x^{th}$ command, $Tag[x]$ is a tag showing the consecutive number x of the $x^{th}$ command, $B[x]$ is data for transferring by the $x^{th}$ command, and $C[x]$ shows status information for returning to the issuing source of the $x^{th}$ command. The second and third levels show a series of processing procedures performed by command analysis unit 11 to "accept $x^{th}$ command", "analyze command", "issue interrupt", and "end" a process. At the second and third levels, "x" equals "1" (x=1) and "2" (x=2), respectively.

"Accept $x^{th}$ command" is processing to accept the $x^{th}$ command having $Tag[x]$ appended and announce the $x^{th}$ process. "Command processing[x]" involves the analysis of the command to which $Tag[x]$ is appended, and the decoding of start address A and sector number s of the command.

"Data transfer of $x^{th}$ process" involves sending data $B[x]$ transferred sequentially for analysis by drive device 4 from command analysis unit 11 to SD card 1. This data transfer continues until the number of transferred sectors reaches a scheduled number u. Sector number s obtained from the command analysis is set as the initial value of scheduled number u. The above is the processing by command analysis unit 11 at the second level. Focusing next on the third level reveals that the analysis of the $x+1^{th}$ command in FIG. 5 is performed without waiting for the data transfer relating to the $x^{th}$ process to end. This is to enable the writing by the $x^{th}$ and $x+1^{th}$ commands to be executed in one process. In combining the writing by different commands into the one process, command analysis unit 11 not only analyzes address B and sector number t from the $x+1^{th}$ command, but also judges whether an address $A+u+1$ obtained by adding u+1 to address A of the $x^{th}$ command matches address B of the $x+1^{th}$ command. FIG. 5 shows the case in which continuity does not exist. In this case, drive device 4 receives status information from SD card 1 and returns an interrupt signal to host device 2, after transferring all the data for writing by the $x^{th}$ command.

Figure 6:
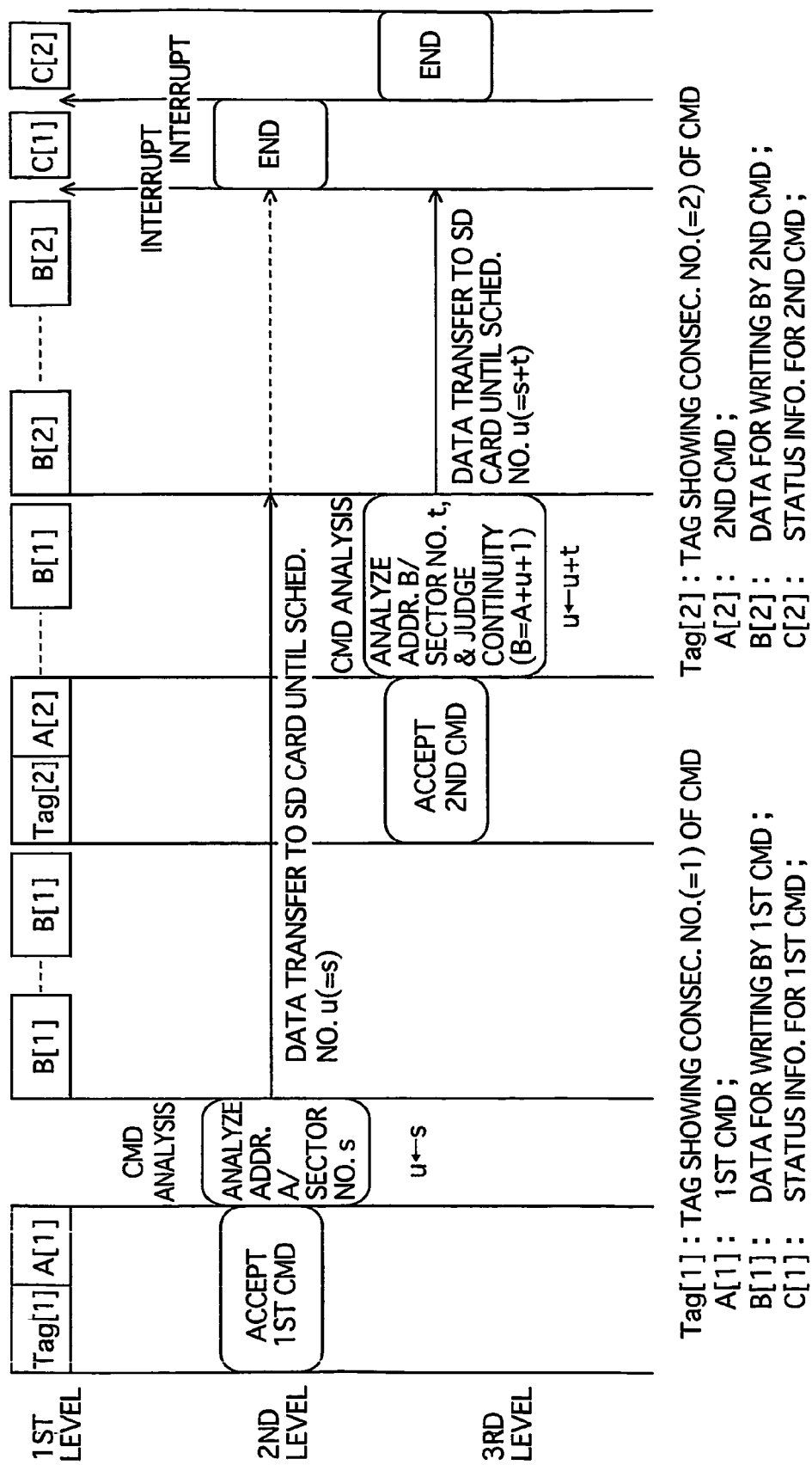
FIG. 6 is a timing chart when there is continuity.

On the other hand, FIG. 6 shows the case in which continuity does exist. In this case, drive device 4 proceeds to transfer data (data for writing with the $x+1^{th}$ command) transmitted from host device 2, after having updated scheduled number u by adding sector number t without returning an interrupt signal to host device 2, even after the transfer of data for writing with the $x^{th}$ command. Drive device 4 receives status information from SD card 1 at the point when the transferred sector number reaches scheduled number $u(=s+t)$, and returns an interrupt signal to host device 2.

Since drive device 4, in the case of the address of one command being consecutive with the address of the next command, continues the transfer of data for writing with the next command without issuing a STOP instruction to SD card 1, the correlation table update and data verification by SD card 1 is performed once for every plurality of commands. Reducing the number of times that the table update and data verification need to be performed opens up the possibility of improving the transfer rate.

Figure 7:
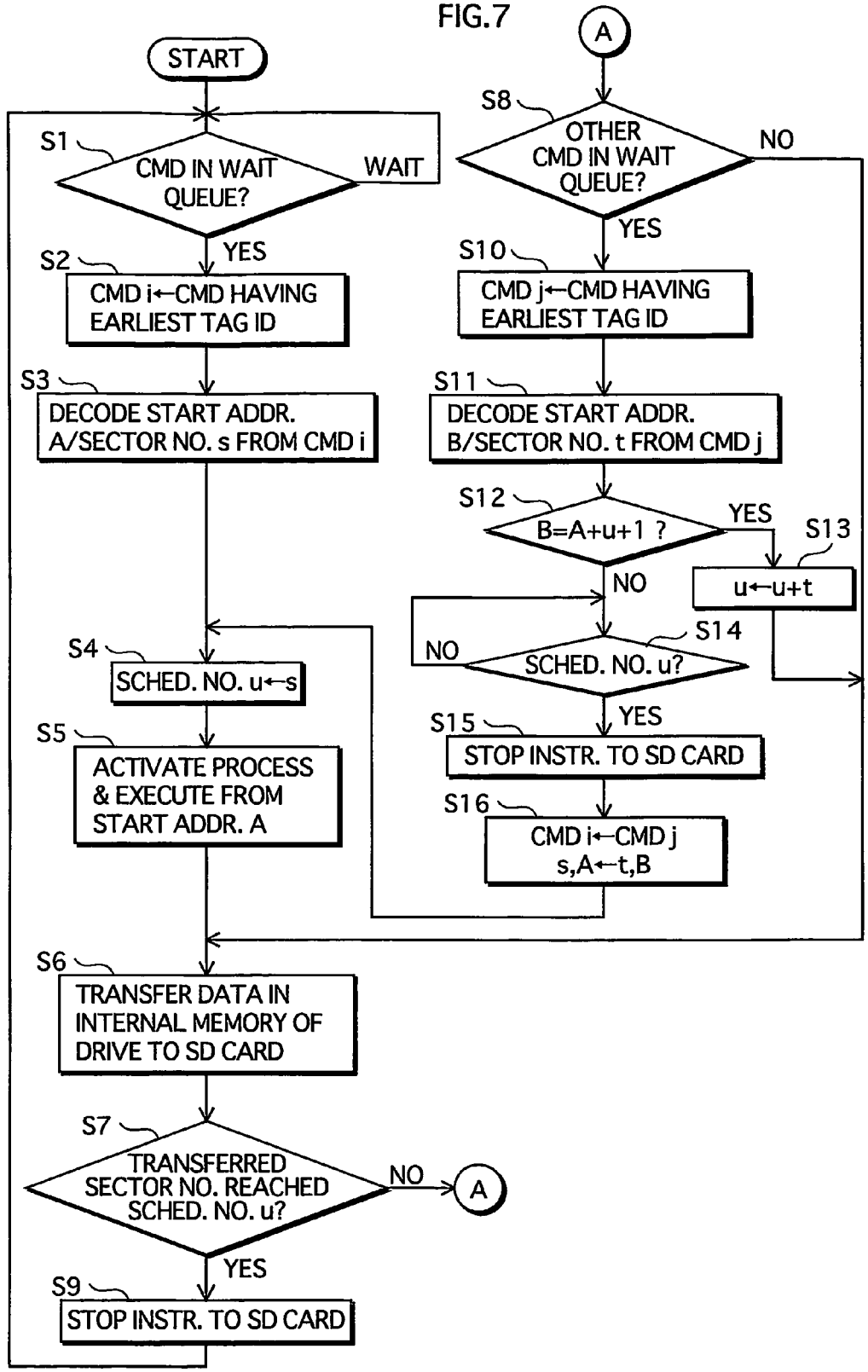
FIG. 7 is a flowchart showing processing by command analysis unit 11.

Command analysis unit 11 is realized by having a general-purpose microprocessor execute the processing procedures shown in the FIG. 7 flowchart, which are described using a computer-readable language. The processing procedures performed by command analysis unit 11 are described next while referring to this flowchart.

Command analysis unit 11 waits for at least one ATA command to be stored in command memory 9, and when this is the case (step S1=YES), unit 11 sets the command having the earliest tag ID to command i (step S2), decodes address A and sector number s from command i (step S3), and sets scheduled number u to sector number s (step S4), before activating the process. Unit 11 executes the writing from start address A (step S5), and moves to the loop processing formed from steps S6 to S8. This loop processing involves processing to transfer data stored sequentially in data memory 10 of drive device 4 to SD card 1 (step S6) being repeated until the result of steps S7 and S8 is "YES".

When the transferred sector number reaches scheduled number u (step S7=YES), command analysis unit 11 has a STOP instruction issued to SD card 1 and returns to step S1. If one or more other ATA commands are stored in command memory 9 (step S8=YES), unit 11 sets the ATA command having the earliest tag ID to command j (step S10), decodes address B and sector number t from command j (step S11), and judges the continuity of commands i and j. This judgment is performed by judging whether an address obtained by adding u+1 to address A of command i matches address B of command j (step S12). If there is continuity, unit 11 adds sector number t of command j to scheduled number u (step S13), and moves to step S6. If there is not continuity, unit 11 judges whether the transferred sector number has reached scheduled number u (step S14), and when reached, unit 11 has a STOP instruction issued to SD card 1 (step S15), sets command j to command i and t,B to s,A (step S16) and moves to step S4.

Figure 8:
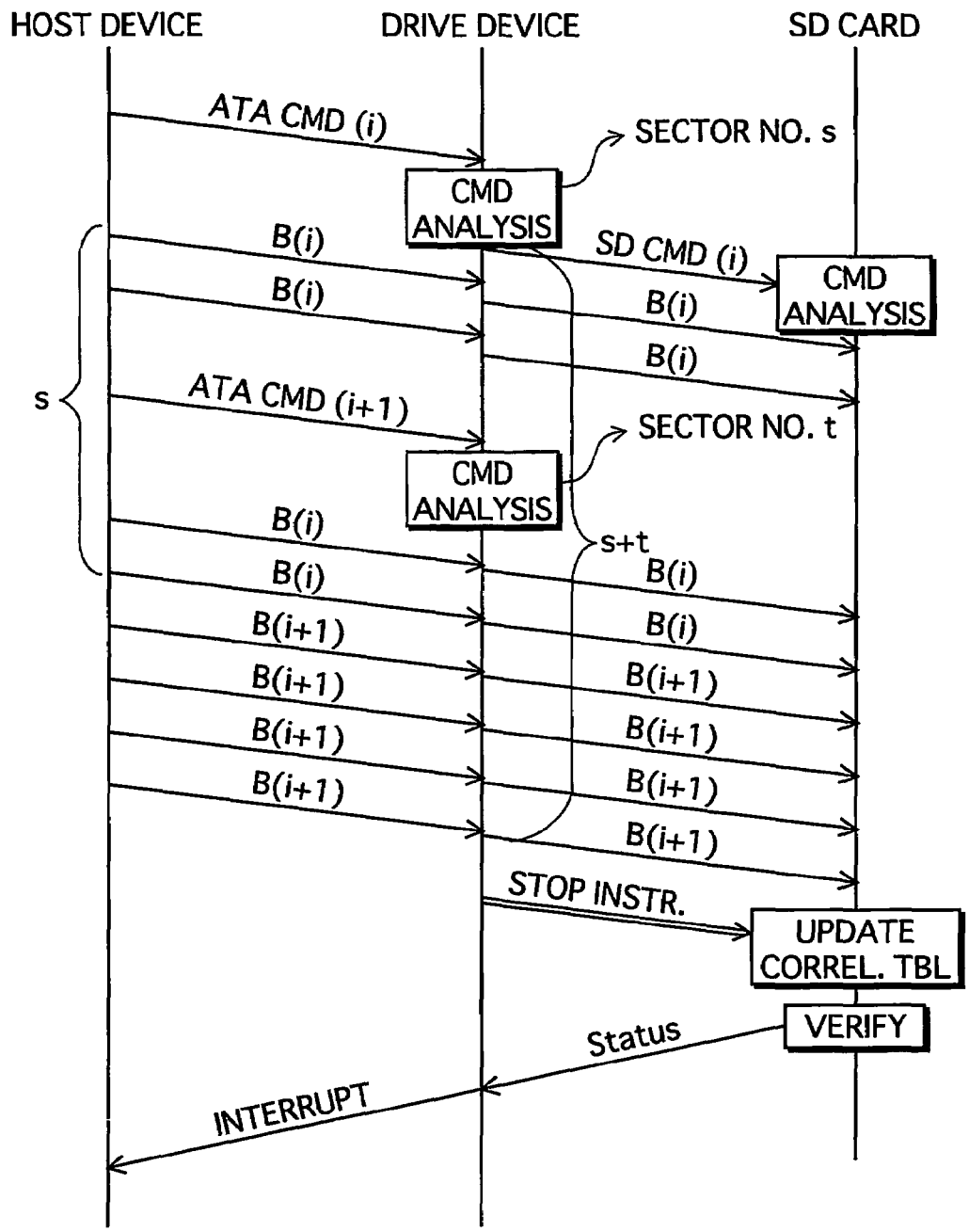
FIG. 8 shows a communication sequence between host device 2, drive device 4 and SD card 1, using the same notation as FIG. 2.

FIG. 8 shows a communication sequence between host device 2, drive device 4 and SD card 1, using the same notation as FIG. 2. FIG. 8 differs from FIG. 2 in that ATA command [i+1] is transmitted from host device 2 to drive device 4 and analysis of ATA command [i+1] performed before the number of transfers by ATA command [i] has reached scheduled number u(=s). If continuity is judged to exist between the addresses of ATA command [i] and [i+1], scheduled number u is extended from s to s+t. Since the STOP instruction is issued to SD card 1 after the scheduled number reaches s+t in the case of continuity existing, host device 2 receives one response for every two ATA commands.

With the FIG. 8 example, one ATA command and the next ATA command are executed in a single process, although this is merely the result of prioritizing the drawing of the figure. As long as continuity exists between the addresses, ATA commands may be executed one after another in the one process.

According to the present embodiment 1, overheads are incurred once for every plurality of ATA commands because of the writing to memory card by a plurality of commands being executed in a single process. In terms of the transfer rate, the numerator in this case is the total data size writable with the plurality of ATA commands, and the denominator is a time period that includes one set of overheads. The fact that there is no increase in the time period of the denominator opens up the possibility of transfer rate improvements.

While embodiment 1 is described above in terms of there being one SD card, in the case of four SD card, for instance, the four card control units 8a to 8d may perform the above writing operations in parallel whenever command analysis unit 11 decodes an ATA command. This parallel writing allows the transfer rate to be further improved. A drive device pertaining to the present invention is, as a result, able to favorably perform the recording of video data.

Also, since one response is sent to host device 2 for every plurality of ATA commands, it is possible to unsynchronize the transfer between host device 2 and drive device 4. This unsynchronization allows the execution of transfers in which drive device 4 is respectively the master and the target to be time divided.

Note that while continuity with the next ATA command is judged in embodiment 1 using consecutive numbers, drive device 4 may be equipped with a rearranging unit that rearranges the plurality of ATA commands in the drive device in order of their write addresses. In this case, command analysis unit 11 may perform the command analysis in accordance with the order after the rearranging by the rearranging unit.

Embodiment 2

In embodiment 1, processing to be performed with a plurality of commands is executed in a single process if there is continuity between the write addresses. However, it is not necessarily the case that the longer the data size writable with a single process, the better. This is because SD card 1 has units called erasable blocks, and in the writing of data these erasable blocks must initially be returned to a blank state before data is written thereto. When the writing by a plurality of commands is performed in a single process, inefficient writing referred to here as "wraparound saving" arises if the sector number to be written is a non-integer multiple of an erasable block size.

FIGS. 9A to 9D show an example of wraparound saving. The erasable blocks in FIGS. 9A to 9D are here structured from p number of recording blocks. The given example assumes the rewriting of only data B of two pieces of data A and B written into one of the erasable blocks (upper block in FIG. 9A) in the nonvolatile memory. In this case, SD card 1 searches the nonvolatile memory for an erasable block in a blank state, and if such an erasable block exists, SD card 1 writes new data B to the free block (lower block in FIG. 9B). Next, SD card 1 copies data A written into the upper erasable block to the lower erasable block (see FIG. 9C). SD card 1 then erases the upper erasable block (see FIG. 9D).

The writing rate drops in the event of wraparound saving because writing needs to be performed twice. Furthermore, the logical and physical addresses need to be updated whenever wraparound saving arises due to the physical location of recorded data being updated. Here, host device 2 pertaining to embodiment 2, in issuing data for writing to consecutive addresses, transmits the next ATA command to drive device 4 with a prohibit flag appended when the number of sectors for writing to SD card 1 reaches an integer multiple of the erasable block size. Drive device 4 performs write controls to execute the ATA commands in a single process if continuity exists, and when an ATA command with a prohibit flag appended is received, drive device 4 transmits a STOP instruction to SD card 1 at the point when the transferred sector number reaches the scheduled number of the ongoing data transfer. As a result, the process is concluded at a point when the number of sectors transferred to SD card 1 reaches an integer multiple of the erasable block size, thereby avoiding the partial writing of erasable blocks.

FIG. 10 shows processing by command analysis unit 11 in embodiment 2. The total data length for writing by the m number of ATA commands in FIG. 10 (A[1], A[2], ..., A[m]) is here assumed to equal the size of a single erasable block, and there is assumed to be continuity between the write addresses up to at least A[m]. A tag having a prohibit flag is appended to A[m+1], which is the ATA command transmitted after A[m]. Analysis of A[m+1] by command analysis unit 11 is performed during the transfer of data corresponding to A[m], but the continuity of A[m+1] is not judged due to the appending of a tag having the prohibit flag. Drive device 4 issues a STOP instruction to SD card 1 at the point when the sectors transferred as a result of the ongoing transfer reaches scheduled number u (point 1), to conclude the process at the point when the writing by ATA command A[m] ends. The writing to SD card 1 thus ends at the point when the written data is an integer multiple of the erasable block size.

According to embodiment 2, the occurrence of wrap-around saving can be avoided because of avoiding partial writing that does not equate to an integer multiple of the size of one erasable block, thereby enabling the transfer rate to be improved.

Embodiment 3

With embodiment 1, it is possible, if the next command is transmitted before the transfer by the previous command has been completed, to combine the writing by these commands in a single process. However, if the next command is not received before the transfer by the current command has been completed, integration in the one process is no longer possible. Host device 2 pertaining to embodiment 3, which is designed to deal with such cases, transmits ATA commands with a wait flag appended thereto. If an ATA command with a wait flag is analyzed, command analysis unit 11 does not issue a STOP instruction, even when the scheduled number of sectors has been transferred to SD card 1. Because of this, the process is not concluded even though data transfer is not being performed. With no data for writing to SD card 1, command analysis unit 11 waits for the next command to be received from host device 2, and when received, unit 11 analyzes the command, and combines the writing by this command in the ongoing process if continuity exists.

Figure 11:
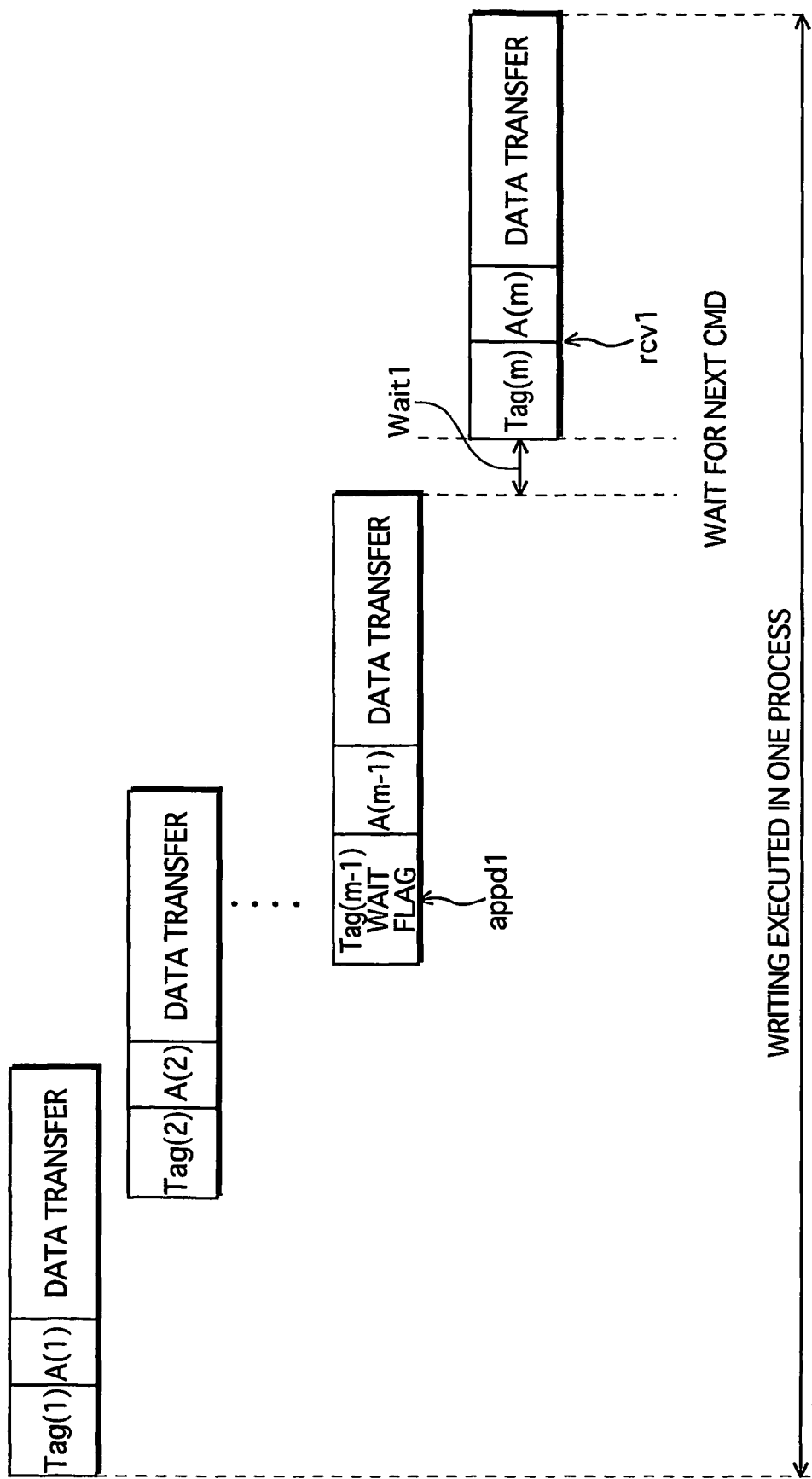
FIG. 11 shows processing by command analysis unit 11 in an embodiment 3.

FIG. 11 shows the processing by command analysis unit 11 in embodiment 3. A tag that includes a wait flag is appended to ATA command A[m−1] (appd1). The ongoing process is, as a result, not concluded even if the following ATA command A[m] is delayed. With no write data to transfer, command analysis unit 11 waits for ATA command A[m] (wait1 in FIG. 11), and analyzes the command when received (rcv1).

According to embodiment 3, partial writing of erasable blocks does not occur even if the arrival of the next ATA command is delayed over the network via which host device 2 and drive device 4 are connected. There is, as a result, no drop in the transfer rate.

Embodiment 4

Figure 12:
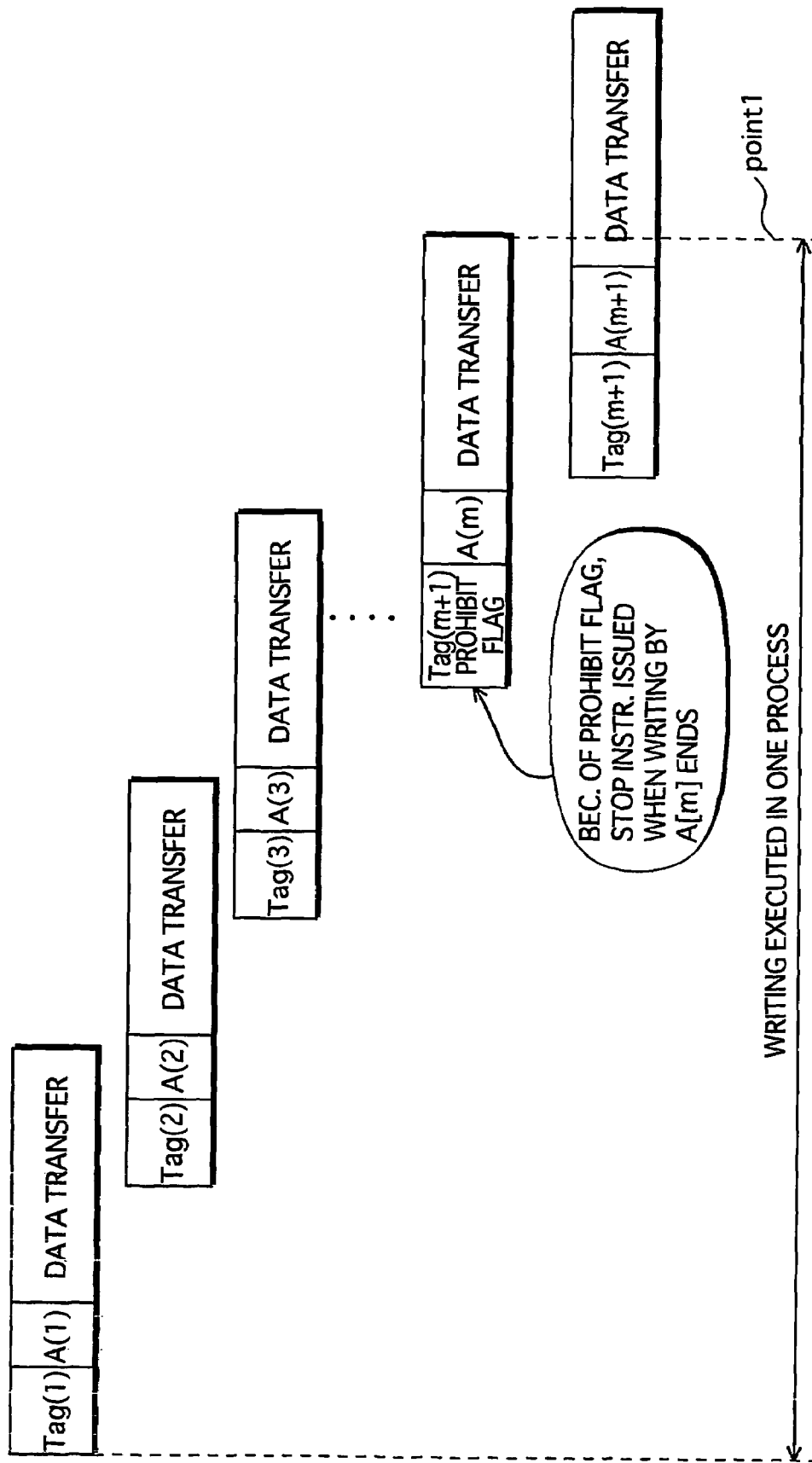
FIG. 12 shows an example of prohibit-flag appending as it pertains to an embodiment 4.

With embodiment 2, command analysis unit 11 has card control unit 8 issue a STOP instruction to conclude the ongoing write process if a prohibit flag is attached to one of the ATA commands. However, it is not possible to conclude the process if the arrival of an ATA command with a prohibit flag is delayed, thus inviting a drop in transfer performance. As such, in embodiment 4, a prohibit flag is appended to the ATA command for performing the final writing of the process (i.e. ATA command whose data transfer results in the transferred data length being an integer multiple of the erasable block size). FIG. 12 shows an example of prohibit-flag appending as it pertains to embodiment 4. As shown in FIG. 12, a prohibit flag is appended to A[m], which is the ATA command for performing the final writing of the process. In FIG. 12, command analysis unit 11 has a STOP instruction issued at the point when the writing by ATA command [m] is finished. Data writing by the ongoing process can thus be concluded quickly, even if the arrival of the following ATA command is delayed, for instance.

Because a prohibit flag is appended to ATA command [m] for performing the final writing of the ongoing process according to embodiment 4, a deterioration in transfer performance is not invited even if, for instance, the arrival of the next ATA command is delayed.

Embodiment 5

Figure 13:
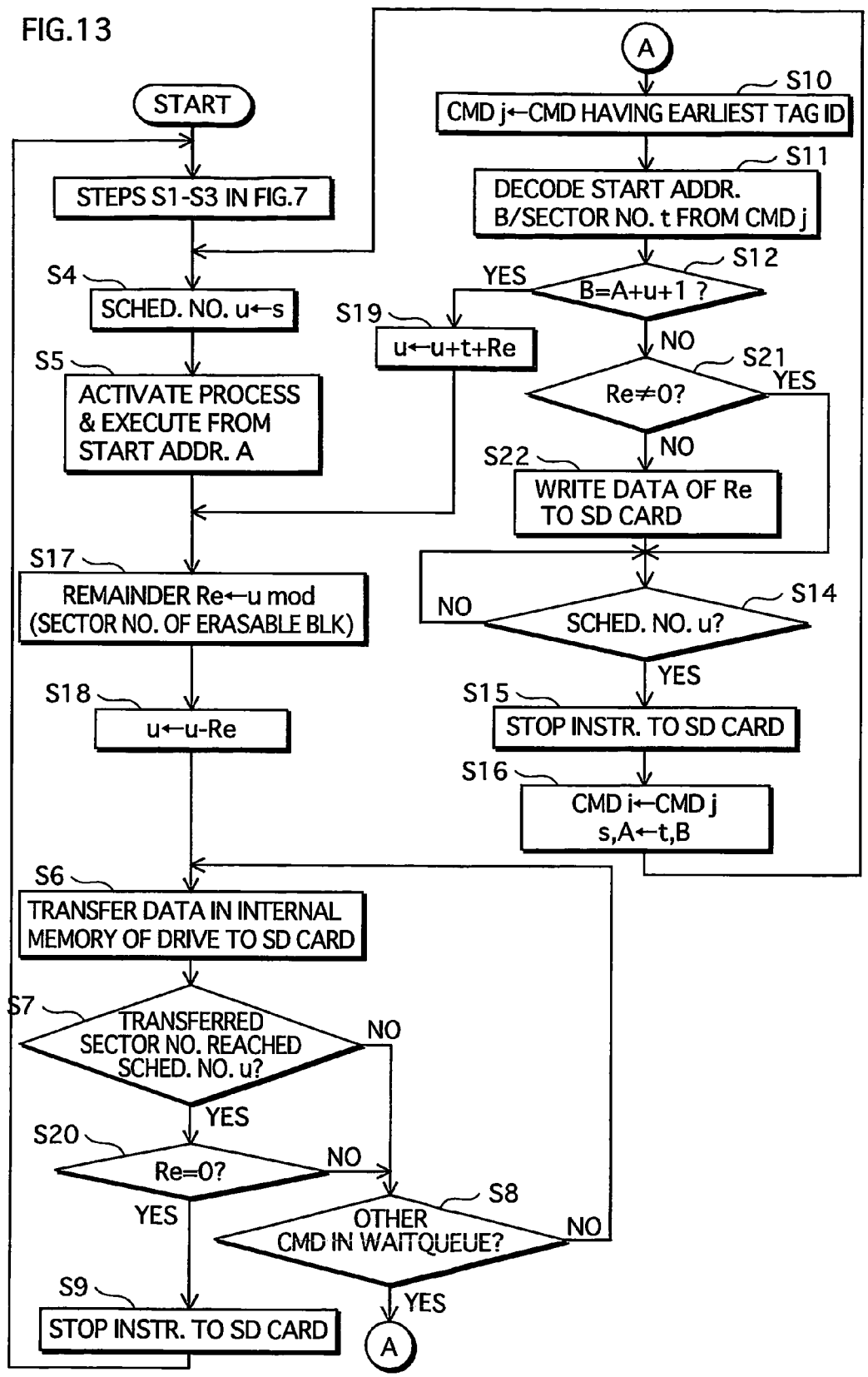
FIG. 13 is a flowchart showing processing by command analysis unit 11 in an embodiment 5.

Embodiment 5 is a modification of the above processing that ensures the data size for writing by ATA commands is an integer multiple of the erasable block size. FIG. 13 is a flowchart showing the processing by command analysis unit 11 in embodiment 5. This flowchart is based on FIG. 7. The difference with FIG. 7 lies in the addition of steps S17 and S18 between steps. S5 and S6, steps S21 and S22 between steps S12 and S14, and step S20 between steps S7 and S9, as well as the replacement of step S13 with step S19.

At step S17, command analysis unit 11 derives the remainder that result from scheduled number u being divided by the sector number of an erasable block. In FIG. 13, "mod" is the operator of a modular arithmetic, and the remainder obtained as a result is "remainder Re". At step S18, scheduled number u is set to a value obtained by subtracting remainder Re from scheduled number u resulting from step 4.

Scheduled number u resulting from steps S17 and S18 is an integer multiple of the sector number per erasable block. At step S19, which replaces step S13, remainder Re and sector number t for writing by the following command j are added to scheduled number u.

As a result of the addition of the above steps S17-S19, scheduled number u for writing by a single command is always an integer multiple of the sector number per erasable block, and data relating to remainder Re is written together with the writing performed by the following command in the case of there being continuity between the addresses.

Step S20 is a check as to whether remainder Re is "0", and if Re=0, a STOP instruction is issued at step S9. If Re≠0, the processing moves to step S8. Thus, command analysis unit 11 only continues to wait for the following command without suspending the process if remainder Re is "0".

On the other hand, if continuity is judged not to exist at step S12, command analysis unit 11 judges whether Re=0 at step S21, and if Re≠0, the data of remainder Re is written to SD card 1 at step S22, before moving to step S14.

A specific example of the processing that results from the FIG. 13 flowchart is described next, while referring to FIGS. 14A to 14D. The specific example assumes the respective data lengths for writing with the first and second commands (commands i & j) to be 96 Kbytes and 160 Kbytes, and the size of each erasable block to be 64 Kbytes. Note that to simplify the description, the size of one sector is assumed to be 1 Kbytes.

Figure 14A:
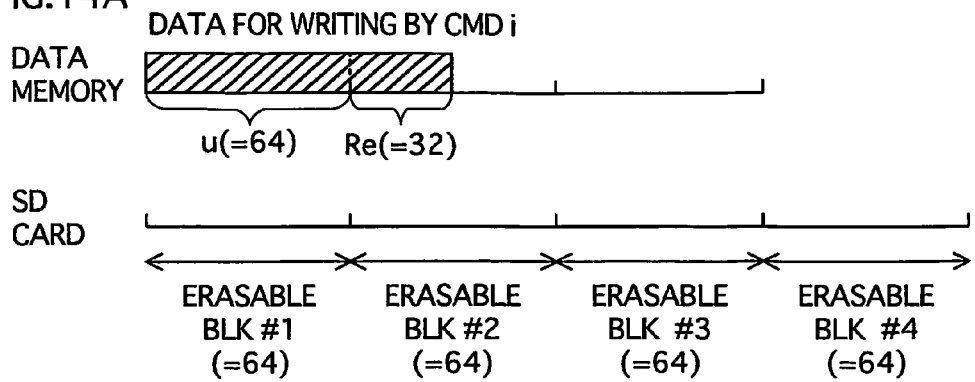
FIGS. 14A-14D show a specific example of the processing by command analysis unit 11 in FIG. 13.
Figure 14B:
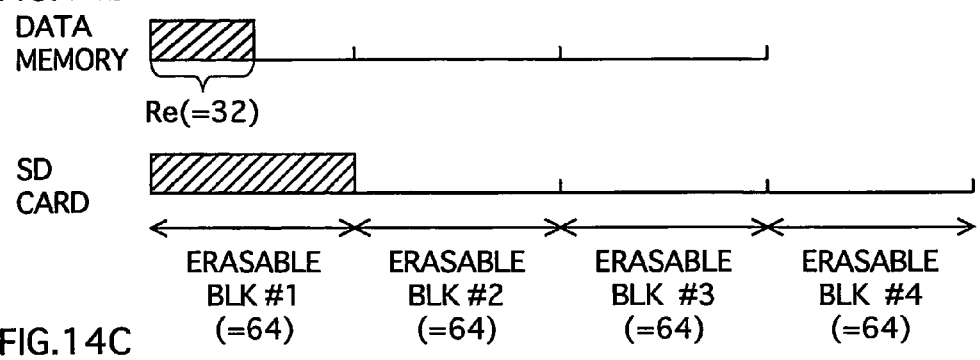
Figure 14C:
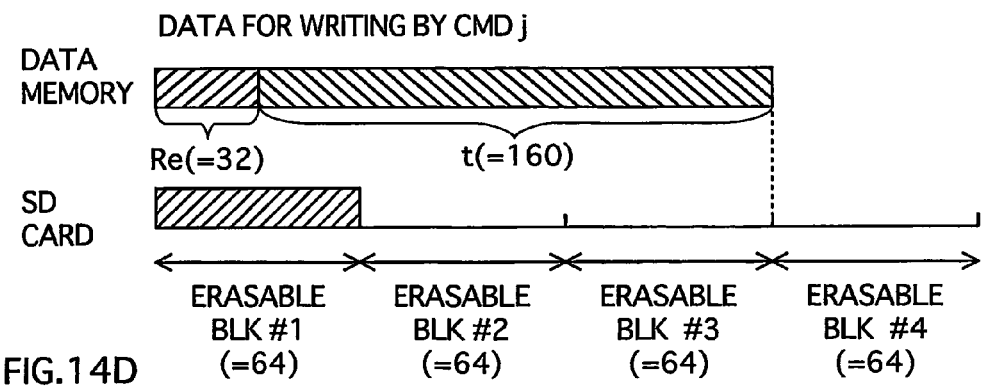
Figure 14D:
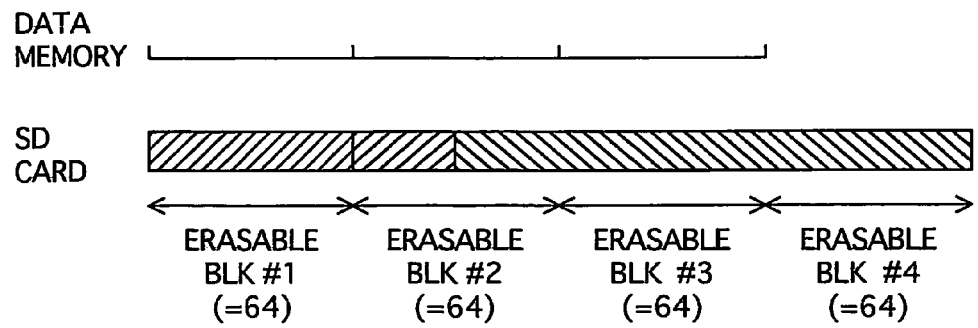

Since there are 96 sectors for writing by command i, scheduled number u derived from steps S17 and S18 is 64 sectors and remainder Re is 32 sectors, which results in data having a 64-Kbyte length being written to erasable block #1 in the SD card, as shown in FIG. 14B. In the case considered here, the reception of the next command is delayed, leaving the wait queue empty. Since remainder Re=32 despite the transferred data length having reached scheduled number u, command analysis unit 11 moves to step S8 without issuing a STOP instruction. As long as remainder Re≠0, the loop processing of steps S6, S7, S20 and S8 is repeated until a command is stored in the wait queue. When the following command j is stored in the wait queue, and the data for writing by command j is stored in the data memory as shown in FIG. 14C, unit 11 performs the processing of steps S10 to S12, and judges whether there is continuity between the addresses. If there is continuity, unit 11 updates scheduled number to a value "256" obtained by adding the sector number t(=160) of command j and remainder Re(=32) to scheduled number u(=64). The processing then moves to steps S17 and S18, and unit 11 proceeds to write data having a 192-Kbyte length (t+Re=160+32) to the three erasable blocks #2 to #4 within the SD card, as shown in FIG. 14D.

According to embodiment 5, command analysis unit 11 continues the ongoing process and waits for the following command if the sector number for writing by the current command is a non-integer multiple of the sector number per erasable block, thereby making it possible to continue the data writing and avoid the partial writing of erasable blocks.

Additional Remarks

While the present invention has been described above based on the preferred embodiments, this is merely an exemplary system exhibiting the best effects anticipated under current conditions. The present invention can be modified within a range that does not depart from the gist of the invention. The following items (A), (B) and (C) are given as representative modifications.

(A) The recording target in the preferred embodiments is assumed to be an SD memory card. However, since the features of the drive device of the present invention depend on the physical qualities of nonvolatile memory with respect to overheads incurred in data writing, any type of recording medium may be applied as long as these physical qualities are present. Examples include Compact Flash Card, SmartMedia Card, Memory Stick, MultiMedia Card, and PCMCIA cards.

(B) A computer program expressing the processing procedures in the FIG. 7 flowchart constitutes an invention in itself, given that the information processing that results from the computer program shown in FIG. 7 is specifically realized using hardware resources. While the preferred embodiments relate to the implementation of computer programs pertaining to the present invention in a state in which the programs are incorporated in the drive device, the programs shown in the embodiments may be implemented on their own, separately from the drive device. Actions to implement the programs in isolation include: (1) producing the programs, (2) assigning the programs either gratuitously or for a fee, (3) loaning, (4) importing or (5) making the programs available to the public via a two-way electronic communication circuit, and (6) offering to assign or loan the programs to the general user by means of shop-front display, catalog solicitation and pamphlet distribution etc.

(C) The element of "time" in the steps executed in time series in the FIG. 7 flowchart is considered an essential item in specifying the invention. From this it is understood that the processing procedures resulting from the FIG. 7 flowchart disclose the usage configuration of a recording method. Needless to say, as long as the processing in the flowchart is carried out so that the original object of the present invention is achieved and the actions and effects realized, by performing the processing of each step in time series, these processing procedures naturally equate to the implementation action of a recording method pertaining to the present invention.

INDUSTRIAL APPLICABILITY

A drive device pertaining to the present invention, being able to raise the transfer rate when writing data to memory card, is ideally suited to the use of memory cards in the recording of video data. Given its suitability when recording video data to memory card, a drive device pertaining to the present invention offers high potential for use in video equipment industries concerned with the manufacture of video equipment.

The invention claimed is:

1. A drive device for writing data transmitted by a host device onto a memory card in accordance with a command issued by the host device, the drive device comprising:
    a receiving unit operable to receive a plurality of commands issued by the host device;
    a writing unit operable, if a write end address of one of the received commands is consecutive with a write start address of a following command, to perform the data writing to the memory card by the consecutive commands in a single process;
    an analysis unit operable to decode the write-start address and a sector number of each command, the sector number being the number of sectors of data for writing with the command; and
    an instruction unit operable to give the STOP instruction at a point when a written sector number reaches s+t, where s is the sector number of the one command and t is the sector number of the following command, wherein
    the process involves processing to sequentially write data received from the host device to the memory card being repeated until a STOP instruction is given,
    the process is activated when the analysis unit decodes a write-start address A and the sector number s from the one command, and involves the data writing being started from the write-start address A,
    a wait flag is appended to a command received from the host device,
    the analysis unit analyzes the following command until the written sector number reaches s,
    if the command with the wait flag is received and a following command has yet to be received, the analysis and instruction units wait for the following command to be received,
    the instruction unit gives the STOP instruction when the written sector number reaches s+t, if a write-start address B of the following command is consecutive with a write-end address A+s of the one command,
    the analysis unit judges whether a prohibit flag is appended to the following command, and
    the instruction unit (i) gives the STOP instruction at a point when the written sector number reaches s if the prohibit flag is appended to the following command, and (ii) gives the STOP instruction at the point when the written sector number reaches s+t if the prohibit flag is not appended to the following command and the write-start address B of the following command is consecutive with the write-end address A+s of the one command.

2. The drive device in claim 1, wherein the host device transmits commands with a tag attached thereto to the drive device sequentially, the tags showing an order of the commands.

3. The drive device in claim 1, further comprising:
    a storage unit operable to store commands received from the host device; and
    a rearranging unit operable to rearrange the stored commands in order of the write-start addresses, wherein
    the analysis unit performs the analysis in the rearranged order of the commands.

4. The drive device of claim 1, wherein
    the analysis unit judges whether s+t is an integer multiple of the number of sectors in an erasable block of the memory card, and
    if judged in the negative, the instruction unit continues the process by not giving the STOP instruction even if the written sector number reaches s+t, and waits for a further command to be received.

5. A drive device for writing data transmitted by a host device onto a memory card in accordance with a command issued by the host device, the drive device comprising:
- a receiving unit operable to receive a plurality of commands issued by the host device;
- a writing unit operable, if a write end address of one of the received commands is consecutive with a write start address of a following command, to perform the data writing to the memory card by the consecutive commands in a single process;
- an analysis unit operable to decode the write-start address and a sector number of each command, the sector number being the number of sectors of data for writing with the command; and
- an instruction unit operable to give the STOP instruction at a point when a written sector number reaches s+t, where s is the sector number of the one command and t is the sector number of the following command, wherein
- the process involves processing to sequentially write data received from the host device to the memory card being repeated until a STOP instruction is given,
- the process is activated when the analysis unit decodes a write-start address A and the sector number s from the one command, and involves the data writing being started from the write-start address A,
- a wait flag is appended to a command received from the host device,
- the analysis unit analyzes the following command until the written sector number reaches s,
- if the command with the wait flag is received and a following command has yet to be received, the analysis and the instruction units wait for the following command to be received,
- the instruction unit gives the STOP instruction when the written sector number reaches s+t, if a write-start address B of the following command is consecutive with a write-end address A+s of the one command,
- the analysis unit judges whether a prohibit flag is appended to the one command, and
- the instruction unit (i) gives the STOP instruction at a point when the written sector number reaches s, if the prohibit flag is appended to the one command, and (ii) gives the STOP instruction at the point when the written sector number reaches s+t, if the prohibit flag is not appended to the one command and the write-start address B of the following command is consecutive with the write-end address A+s of the previous command.

6. The drive device in claim 5, wherein the host device transmits commands with a tag attached thereto to the drive device sequentially, the tags showing an order of the commands.

7. The drive device in claim 5, further comprising:
- a storage unit operable to store commands received from the host device; and
- a rearranging unit operable to rearrange the stored commands in order of the write-start addresses, wherein
- the analysis unit performs the analysis in the rearranged order of the commands.

8. The drive device of claim 5, wherein
- the analysis unit judges whether s+t is an integer multiple of the number of sectors in an erasable block of the memory card, and
- if judged in the negative, the instruction unit continues the process by not giving the STOP instruction even if the written sector number reaches s+t, and waits for a further command to be received.

9. A computer program for causing a computer to execute processing to write data transmitted by a host device onto a memory card in accordance with a command issued by the host device, the computer program being stored on a computer-readable medium and comprising code operable to cause the computer to perform the steps of:
- receiving a plurality of commands issued by the host device;
- if a write end address of one of the received commands is consecutive with a write start address of a following command, performing the data writing to the memory card by the consecutive commands in a single process;
- decoding, by an analysis unit, the write-start address and a sector number of each command, the sector number being the number of sectors of data for writing with the command; and
- giving the STOP instruction, by an instruction unit, at a point when a written sector number reaches s+t, where s is the sector number of the one command and t is the sector number of the following command, wherein
- the process involves processing to sequentially write data received from the host device to the memory card being repeated until a STOP instruction is given,
- the process is activated when a write-start address A and the sector number s from the one command is decoded, and involves the data writing being started from the write-start address A,
- a wait flag is appended to a command received from the host device,
- the following command is analyzed until the written sector number reaches s,
- if the command with the wait flag is received and a following command has yet to be received, the analysis and instruction units wait for the following command to be received,
- the STOP instruction is given, by the instruction unit, when the written sector number reaches s+t, if a write-start address B of the following command is consecutive with a write-end address A+s of the one command,
- the following command is judged, by the analysis unit, as to whether a prohibit flag is appended thereto, and
- the STOP instruction is given, by the instruction unit, (i) at a point when the written sector number reaches s if the prohibit flag is appended to the following command, and (ii) at the point when the written sector number reaches s+t if the prohibit flag is not appended to the following command and the write-start address B of the following command is consecutive with the write-end address A+s of the one command.

10. A computer program for causing a computer to execute processing to write data transmitted by a host device onto a memory card in accordance with a command issued by the host device, the computer program being stored on a computer-readable medium and comprising code operable to cause the computer to perform the steps of:
- receiving a plurality of commands issued by the host device;
- if a write end address of one of the received commands is consecutive with a write start address of a following command, performing the data writing to the memory card by the consecutive commands in a single process;
- decoding, by an analysis unit, the write-start address and a sector number of each command, the sector number being the number of sectors of data for writing with the command; and
- giving the STOP instruction, by an instruction unit, at a point when a written sector number reaches s+t, where s is the sector number of the one command and t is the sector number of the following command, wherein the process involves processing to sequentially write data received from the host device to the memory card being repeated until a STOP instruction is given, the process is activated when a write-start address A and the sector number s from the one command is decoded, and involves the data writing being started from the write-start address A, a wait flag is appended to a command received from the host device, the following command is analyzed until the written sector number reaches s, if the command with the wait flag is received and a following command has yet to be received, the analysis and instruction units wait for the following command to be received, the STOP instruction is given, by the instruction unit, when the written sector number reaches s+t, if a write-start address B of the following command is consecutive with a write-end address A+s of the one command, the one command is judged, by the analysis unit, as to whether a prohibit flag is appended thereto, and the STOP instruction is given, by the instruction unit, (i) at a point when the written sector number reaches s if the prohibit flag is appended to the one command, and (ii) at the point when the written sector number reaches s+t if the prohibit flag is not appended to the one command and the write-start address B of the following command is consecutive with the write-end address A+s of the previous command.

* * * * *